(12) United States Patent
Darisa et al.

(10) Patent No.: US 10,891,066 B2
(45) Date of Patent: Jan. 12, 2021

(54) DATA REDUNDANCY RECONFIGURATION USING LOGICAL SUBUNITS

(71) Applicant: Intelliflash by DDN, Inc., Santa Clara, CA (US)

(72) Inventors: Venkata Ramprasad Darisa, Bangalore (IN); Abhishek Agarwal, Bangalore (IN); Angshuman Devchoudhury, Bangalore (IN)

(73) Assignee: INTELLIFLASH BY DDN, INC., Santa Clara, CA (US)

( * ) Notice: Subject to any disclaimer, the term of this patent is extended or adjusted under 35 U.S.C. 154(b) by 0 days.

(21) Appl. No.: 16/234,884

(22) Filed: Dec. 28, 2018

(65) Prior Publication Data

US 2020/0210090 A1 Jul. 2, 2020

(51) Int. Cl.
*G06F 3/06* (2006.01)
*G06F 11/10* (2006.01)

(52) U.S. Cl.
CPC .......... *G06F 3/0647* (2013.01); *G06F 3/0614* (2013.01); *G06F 3/0689* (2013.01); *G06F 11/1076* (2013.01)

(58) Field of Classification Search
None
See application file for complete search history.

(56) References Cited

U.S. PATENT DOCUMENTS

| | | | |
|---|---|---|---|
| 6,275,898 B1 | 8/2001 | DeKoning | |
| 7,082,498 B2 | 7/2006 | ChatterJee et al. | |
| 8,239,624 B2 | 8/2012 | Galloway et al. | |
| 2002/0152415 A1* | 10/2002 | Franklin | G06F 3/061 |
| | | | 714/6.22 |
| 2007/0143541 A1 | 6/2007 | Nichols et al. | |

* cited by examiner

*Primary Examiner* — Michael Alsip
(74) *Attorney, Agent, or Firm* — David R. Stevens; Stevens Law Group

(57) ABSTRACT

Example storage systems, storage controllers, and methods provide data redundancy reconfiguration using logical subunits. Storage devices are configured in a storage group with a first data redundancy configuration. A second data redundancy configuration is selected and the space available in the storage group is determined. For each logical data unit, logical data subunits are selected, written to the space available in the second data redundancy configuration, and deleted from the logical data unit. Storage operations using the storage group may be maintained during the migration process.

20 Claims, 7 Drawing Sheets

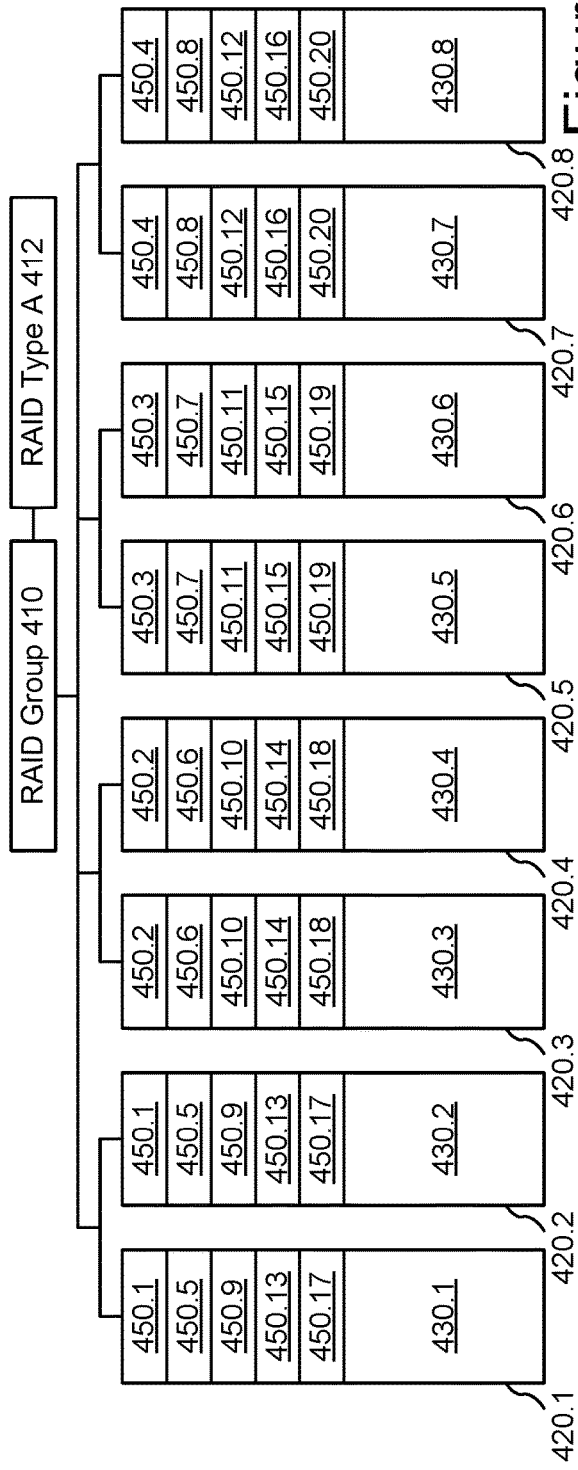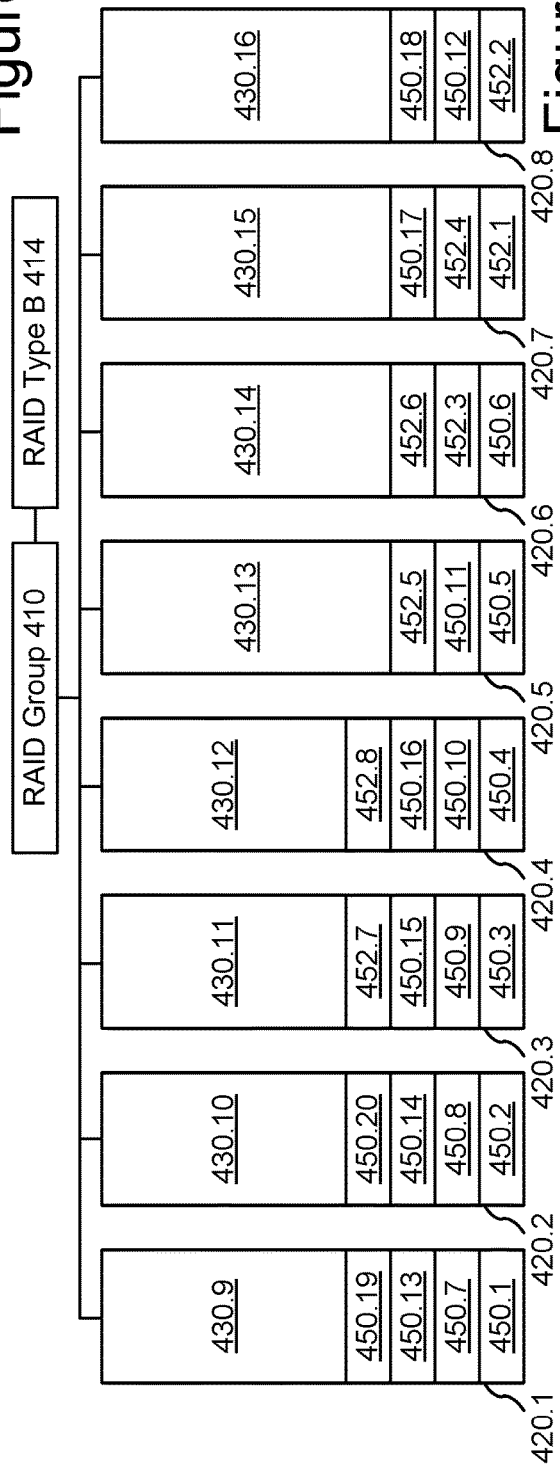

DATA REDUNDANCY RECONFIGURATION USING LOGICAL SUBUNITS

TECHNICAL FIELD

The present disclosure generally relates to data storage systems, and in a more particular example, to data storage systems configured for data redundancy in storage groups, such as redundant array of independent disks (RAID) groups.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a data protection or data redundancy configuration, such as a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

In some storage systems, data may be stored in a group of storage devices according to a data redundancy configuration, such as a first RAID level. However, changes in system use, available technology, or other factors may cause the system administrator to want to reconfigure the storage group to use a different data redundancy configuration, such as a second RAID level. The system administrator may not wish to lose the data currently stored in the storage group and, further, may not be able to take the storage group offline for the reconfiguration process. For example, the storage group may contain user data for one or more applications that need to be available for data operations. Further, the system administrator may not have a second set of storage devices to migrate the data onto and may wish to use available space within the existing storage group to receive the reconfigured data.

Therefore, there still exists a need for storage architectures that enable reconfiguration of data redundancy configurations within a storage group without a need for additional storage devices. Storage architectures that support data recovery reconfiguration without taking the storage group offline may be further beneficial.

SUMMARY

Various aspects for data redundancy reconfiguration within the same group of storage devices, particularly, iterative migration of logical subunits to a new data redundancy configuration are described. One general aspect includes a system including a processor, a memory, and a plurality of storage devices configured as a storage group in a first data redundancy configuration, where at least one logical data unit is stored in the plurality of storage devices with the first data redundancy configuration. A reconfiguration initiator is stored in the memory and executable by the processor to perform operations including: determining a second data redundancy configuration; determining a space available for the storage group, where the space available for the storage group quantifies a plurality of available data blocks in the plurality of storage devices; selecting at least one logical data subunit from the at least one logical data unit; writing the at least one logical data subunit to the plurality of available data blocks using the second data redundancy configuration; and deleting the at least one logical data subunit from the at least one logical data unit in the first data redundancy configuration.

Implementations may include one or more of the following features. The reconfiguration initiator may be further executable to perform operations including: ordering a plurality of logical data subunits, including the at least one logical data subunit, in a migration order; and repeating, according to the migration order, the selecting, writing, and deleting for each logical data subunit from the plurality of logical data subunits. The reconfiguration initiator may be further executable to perform operations including: generating, responsive to deleting the plurality of logical data subunits, a final logical data subunit corresponding to a set of remaining data blocks in the at least one logical data unit; writing the final logical data subunit to the plurality of available data blocks using the second data redundancy configuration; and deleting, responsive to writing the final logical data subunit, the at least one logical data unit in the first data redundancy configuration. The migration order may be ordered according to size. The reconfiguration initiator may be further executable to perform operations including adding, responsive to deleting the at least one logical data subunit, a plurality of deleted data blocks from the at least one logical data subunit to the plurality of available data blocks. The reconfiguration initiator may be further executable to perform operations including selecting, based on the second data redundancy configuration for the at least one logical data subunit, available blocks from the plurality of available data blocks for receiving the at least one logical subunit. Selecting available blocks may defragment the plurality of available data blocks. The logical data units may be volumes of the storage group. The logical data subunits may be snapshots generated from volumes of the storage group, where the logical data subunits include a plurality of data blocks. The first data redundancy configuration may be a first redundant array of independent disks (RAID) level. The second data redundancy configuration may be a second RAID level that is different from the first RAID level. The system may further include an input/output manager stored in the memory and executable by the processor to perform operations including: performing, during a first reconfiguration phase, read and write operations using the at least one logical data unit in the first data redundancy configuration during selecting, writing, and deleting the at least one logical subunit; performing, during a second reconfiguration phase, write operations using the at least one logical data unit in the first data redundancy configuration and the at least one logical data unit in the second data redundancy configuration; deleting the at least one logical data unit in the first data redundancy configuration; and performing, during a post-reconfiguration phase, read and write operations using the at least one logical data unit in the second data redundancy configuration.

Another general aspect includes a computer-implemented method, including: determining a second data redundancy configuration for at least one logical data unit stored in a plurality of storage devices, where the at least logical data unit is stored with a first data redundancy configuration; determining a space available in the plurality of storage devices, where the space available in the plurality of storage devices quantifies a plurality of available data blocks in the plurality of storage devices; selecting at least one logical data subunit from the at least one logical data unit; writing the at least one logical data subunit to the plurality of available data blocks using the second data redundancy configuration; and deleting, prior to deleting the at least one logical data unit, the at least one logical data subunit from the at least one logical data unit in the first data redundancy configuration.

Implementations may include one or more of the following features. The computer-implemented method may further include: ordering a plurality of logical data subunits, including the at least one logical data subunit, in a migration order; and repeating, according to the migration order, the selecting, writing, and deleting for each logical data subunit from the plurality of logical data subunits. The computer-implemented method may further include: generating, responsive to deleting the plurality of logical data subunits, a final logical data subunit corresponding to a set of remaining data blocks in the at least one logical data unit; writing the final logical data subunit to the plurality of available data blocks using the second data redundancy configuration; and deleting, responsive to writing the final logical data subunit, the at least one logical data unit in the first data redundancy configuration. The migration order may be ordered according to size. The computer-implemented method may further include adding, responsive to deleting the at least one logical data subunit, a plurality of deleted data blocks from the at least one logical data subunit to the plurality of available data blocks. The computer-implemented method may further include selecting, based on the second data redundancy configuration for the at least one logical data subunit, available blocks from the plurality of available data blocks for receiving the at least one logical subunit. Selecting available blocks may defragment the plurality of available data blocks. The logical data units may be volumes of the plurality of storage devices. The logical data subunits may be snapshots generated from volumes of the plurality of storage devices, where the logical data subunits include a plurality of data blocks. The first data redundancy configuration may be a first redundant array of independent disks (RAID) level; and the second data redundancy configuration may be a second RAID level that is different from the first RAID level. The computer-implemented method may further include: performing, during a first reconfiguration phase, read and write operations using the at least one logical data unit in the first data redundancy configuration during selecting, writing, and deleting the at least one logical subunit; performing, during a second reconfiguration phase, write operations using the at least one logical data unit in the first data redundancy configuration and the at least one logical data unit in the second data redundancy configuration; deleting the at least one logical data unit in the first data redundancy configuration; and performing, during a post-reconfiguration phase, read and write operations using the at least one logical data unit in the second data redundancy configuration.

Another general aspect includes a storage system, including: a plurality of storage devices configured as a storage group in a first data redundancy configuration, where at least one logical data unit is stored in the plurality of storage devices with the first data redundancy configuration; means for determining a second data redundancy configuration; means for determining a space available for the storage group, where the space available for the storage group quantifies a plurality of available data blocks in the plurality of storage devices; means for selecting at least one logical data subunit from the at least one logical data unit; means for writing the at least one logical data subunit to the plurality of available data blocks using the second data redundancy configuration; and means for deleting, prior to deleting the at least one logical data unit, the at least one logical data subunit from the at least one logical data unit in the first data redundancy configuration.

Implementations may include one or more of the following features. The storage system may further include: means for performing, during a first reconfiguration phase, read and write operations using the at least one logical data unit in the first data redundancy configuration during selecting, writing, and deleting the at least one logical subunit; means for performing, during a second reconfiguration phase, write operations using the at least one logical data unit in the first data redundancy configuration and the at least one logical data unit in the second data redundancy configuration; means for deleting the at least one logical data unit in the first data redundancy configuration; and means for performing, during a post-reconfiguration phase, read and write operations using the at least one logical data unit in the second data redundancy configuration.

The various embodiments advantageously apply the teachings of multi-device storage systems to improve the functionality of such computer systems. The various embodiments include operations to overcome or at least reduce the issues in the previous storage systems discussed above and, accordingly, are more scalable and efficient than other computer data storage architectures for some applications. That is, the various embodiments disclosed herein include hardware and/or software with functionality to improve the scalability and efficiency of data recovery reconfigurations, based on enabling storage groups to be iteratively migrated between data redundancy configurations on the same set of storage devices using logical subunits. Accordingly, the embodiments disclosed herein provide various improvements to storage systems.

It should be understood that language used in the present disclosure has been principally selected for readability and instructional purposes, and not to limit the scope of the subject matter disclosed herein.

BRIEF DESCRIPTION OF THE DRAWINGS

FIGS. 4A and 4B schematically illustrate an example reconfiguration of a storage group from a first data redundancy configuration to a different data redundancy configuration.

DETAILED DESCRIPTION

Figure 1:
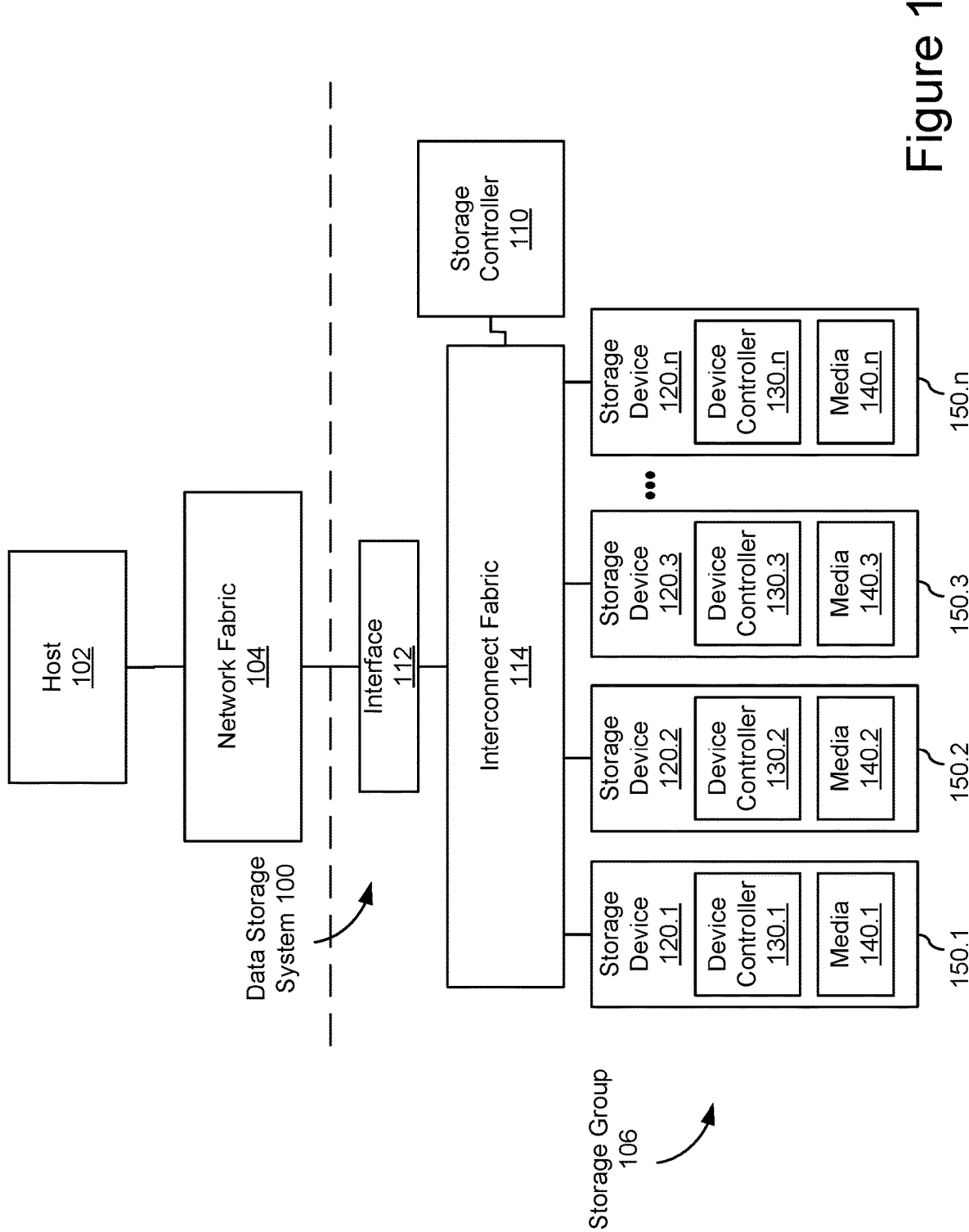
FIG. 1 schematically illustrates an example of a data storage system with a plurality of storage devices configured as a storage group.

FIG. 1 shows an embodiment of an example data storage system 100 with a plurality of data storage devices 120. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or disk drives) configured in a storage group 106.

In the embodiment shown, storage group 106 includes a number of storage devices 120 attached to a common interconnect fabric 114. For example, storage group 106 may include a number of disk drives arranged in a storage array, such as storage devices sharing a common rack or unit in a data center. In some embodiments, storage group 106 may share back plane connectivity, network switch(es), and/or other hardware and software components related to interconnect fabric 114. In some embodiments, peer groups may not be collocated in the same unit, rack, data center, or geography. For example, interconnect fabric 114, network interface 112, and network fabric 104 may enable peer-to-peer communication among storage devices over any distance and peer bonds may be established regardless (or even because of) different geographic locations, data centers, administrators, and organizations.

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing 150, such as a multi-part sealed housing with a defined form factor and ports and/or connectors for interconnecting with interconnect fabric 114.

In some embodiments, a respective data storage device 120 may include a single medium device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 is coupled to data storage devices 120.1-120.n through interconnect fabric 114. However, in some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.n, interconnect fabric 114, or interface 112. Storage controller 110 is sometimes called a controller system, a main controller system, a non-volatile memory express (NVMe) controller, garbage collection (GC) leader, storage virtualization controller (SVC), or redundant array independent disk (RAID) controller. In some embodiments, a device controller 130.1 associated with a particular storage device (e.g., 120.1) acts as storage controller 110 for other storage devices (e.g., 120-2, 120-3, and 120.n) in data storage system 100. In some embodiments, storage controller 110 is a component and/or subsystem of host 102 (described below).

In some embodiments, host 102 is coupled to data storage system 100 through network interface 112 over a network fabric 104. In some embodiments, multiple hosts 102 (only one of which is shown in FIG. 1) are coupled to data storage system 100 through network interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140.

In some embodiments, however, storage controller 110, the one or more device controllers 130, and media devices 140 are included in the same device (i.e., an integrated device) as components thereof. Furthermore, in some embodiments, one or more of the storage devices 120 (e.g., including storage controller 110, the one or more device controllers 130, and media devices 140) are embedded in a host device (e.g., host 102), such as a mobile device, tablet, other computer or computer-controlled device, and the methods described herein are performed, at least in part, by the embedded storage controller. In some embodiments, device controllers 130 are configured to both control one or more media devices 140 and provide distributed storage controller functions in conjunction with storage controller 110.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit or data element may describe any size allocation of data, such as host block, data object, sector, page, multi-plane page, erase/programming block, media device/package, etc. Storage locations may include physical and/or logical locations on media devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on media devices 140, which may also correspond to one or more logical storage locations. In some embodiments, media segments may include a continuous series of physical storage location, such as adjacent data units on a storage medium, and, for flash memory devices, may correspond to one or more media erase or programming blocks.

A logical data group may include a plurality of logical data units or logical data elements that may be grouped on a logical basis, regardless of storage location, such as data objects, files, or other logical data constructs composed of multiple host blocks. Logical data units or elements may be further associated with logical data subunits with a relationship to the logical data units. For example, logical data units may include inodes, volumes in a file system, or buckets in an object system and logical data subunits may include snapshots or objects within those inodes, volumes, or buckets.

A RAID group may be a logical data group comprised of host data elements stored on multiple data storage devices (or similar devices or components subject to independent failure modes) with a data protection or data redundancy configuration, such as parity, mirroring, erasure coding, or other data protection schemes. For example, in a parity-based RAID configuration, the host data elements may be allocated to RAID stripes configured of multiple RAID blocks or RAID chunks across which parity may be calculated and stored in parity blocks or parity chunks. Example RAID configurations may include RAID 10, RAID 5, and RAID 6, which may be described as different RAID levels or data redundancy levels. Other data redundancy configurations may be used in conjunction with the embodiments described herein.

Figure 2:
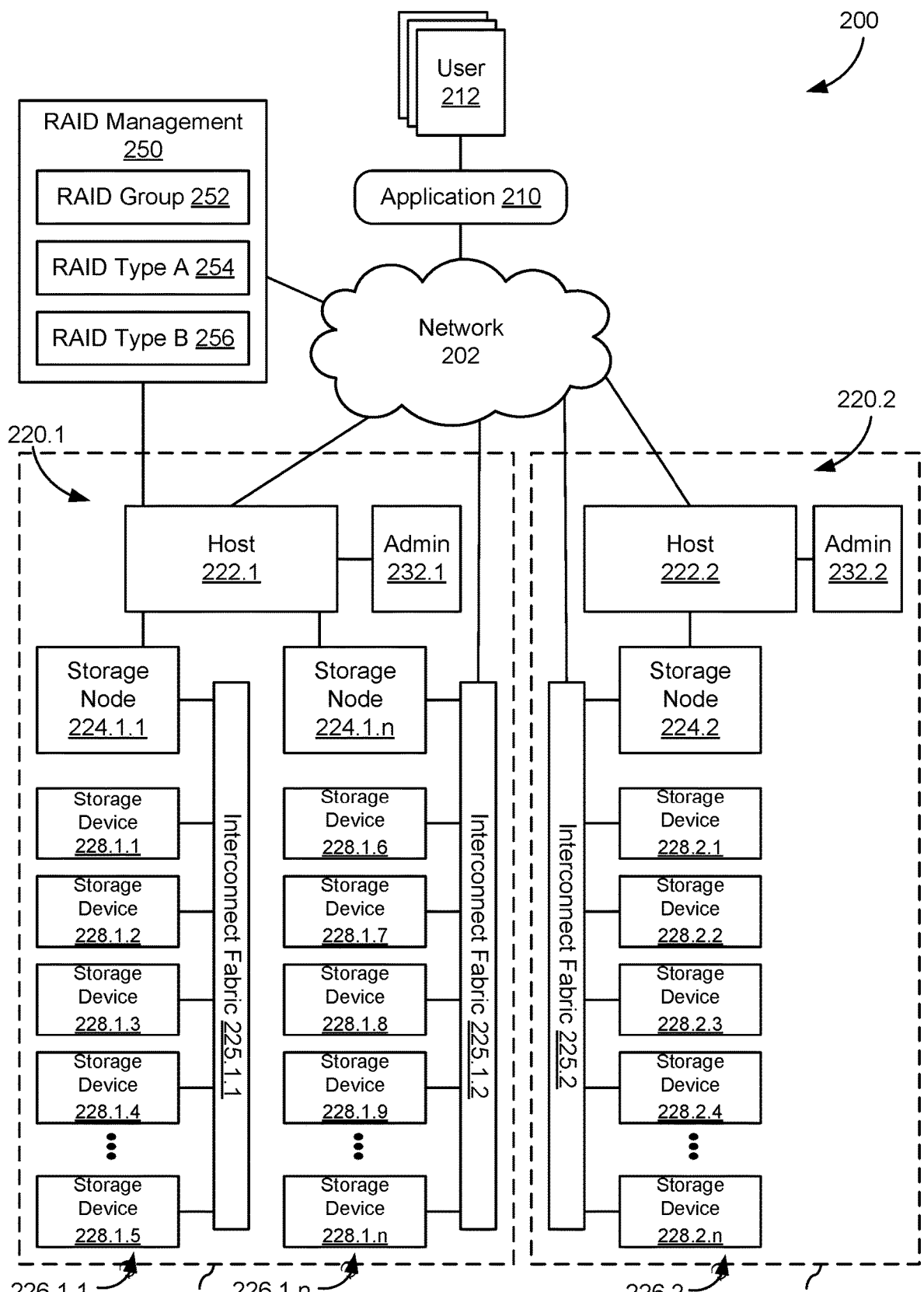
FIG. 2 schematically illustrates an example distributed storage system configuration for one or more data redundancy groups.

FIG. 2 shows an embodiment of an example storage system 200, such as a global storage system implementing multiple distributed storage systems 230 in different locations 220. Storage system 200 may be implemented as a plurality of distributed storage systems 230 which is coupled to an application 210 for accessing, storing, and using data stored in storage system 200. Storage system 200 may include a plurality of storage devices 228 configured as components of the disaggregated storage systems and some or all of these storage devices 228 may be configured for peer communication and allocated in one or more peer groups. In some embodiments, these peer groups may include storage devices at different physical locations 220 with different administrators 232. Additional remote administrators may have various responsibilities for storage system 200 and use a network-based RAID management system 250 to configure, monitor, and control data recovery across storage system 200.

The connection between storage system 200 and application 210 could, for example, be implemented as a suitable data communication network 202, such as a LAN, WAN, internet, etc. Application 210 could, for example, be a dedicated software application running on a computing device, such as a personal computer, a laptop, a wireless telephone, a personal digital assistant or any other type of communication device that is able to interface with the storage system 200. In some embodiments, application 210 could, for example, comprise a suitable file system which enables a general purpose software application to interface with storage system 200, an application programming interface (API) library for the storage system 200, etc. In some embodiments, application 210 may be a user application, such as business or personal application instantiated in a local, client/server, web, and/or mobile application that enables users 212 to interact with data stored in storage system 200.

As further shown in FIG. 2, storage system 200 comprises two storage locations 220 implementing disaggregated storage architectures. Each storage location 220 may include a host node 222 and one or more storage nodes 224 which may be coupled in a suitable way for transferring data, for example by means of interconnect fabrics 225. Each of storage nodes 224 may further connect to a plurality of storage devices 228 arranged in storage arrays 226. Host nodes 222, storage nodes 224, and storage devices 228 may connect to the data communication network 204 and each other by means of suitable wired, wireless, optical, etc. network connections or any suitable combination of such network connections.

Although the example of Figures shows only two host nodes 222, three storage nodes 224, three storage arrays 226, and fifteen storage devices 228, storage system 200 could comprise any other suitable number of controller nodes 222, storage nodes 224, and storage devices 228 arranged in any number of storage arrays 226. As shown in FIG. 1, each storage array 226 may be configured as a storage group, such as a RAID group. In some embodiments, storage groups may not include every storage device in a storage array and/or storage groups may include storage devices from different arrays and/or different locations. Any number of storage devices 228 may be configured for one or more storage groups and, in some embodiments, storage devices 228 may participate in multiple storage groups at the same time.

Host nodes 222 and storage nodes 224 can be built as general-purpose computers, however more frequently they are physically adapted for arrangement in large data centers, where they are arranged in modular racks comprising standard dimensions. Exemplary host nodes 222 and storage nodes 224 may be dimensioned to take up a single unit of such rack, which is generally referred to as 1U. Such an exemplary storage node 224 may use a low-power processor and may be equipped with ten or twelve high capacity serial advanced technology attachment (SATA) storage devices 228 (even though only five storage devices 228 are shown for each storage node 224) and is connectable to the network over redundant Ethernet network interfaces. In some embodiments, storage nodes 224 may include a compute complex providing storage controller or other storage-related functionality.

An exemplary host node 222 may comprise high-performance servers and provide network access to applications 210 over multiple high bandwidth Ethernet network interfaces. Data can be transferred between applications 210 and such a host node 222 by means of a variety of network protocols including hypertext transfer protocol (HTTP)/ representational state transfer (REST) object interfaces, language-specific interfaces such as Microsoft .Net, Python or C, etc. Additionally, such controller nodes may comprise additional high bandwidth Ethernet ports to interface with the storage nodes 224. In some embodiments, HTTP/REST protocols complying with the Amazon Simple Storage Service (S3) object storage service may enable data transfer through a REST application protocol interfaces (API). Preferably, such host nodes 222 operate as a highly available cluster of host nodes, and provide for example shared access to the storage nodes 224, metadata caching, protection of metadata, etc.

Several storage nodes 224 can be grouped together, for example because they are housed in a single rack or a single physical location 220.1. For example, storage nodes 224.1.1 to 224.1.n may be grouped in physical location 220.1 and support host node 202.1, while storage node 224.2 may be located in physical location 220.2 and support host node 202.2. These physical locations 220 are not required to be located at the same geographic location, they are often geographically dispersed across different data centers. For example, physical location 220.1 can be located at a data center in Europe and physical location 220.2 at a data center in China. A storage group may communicate between physical locations 220 and may engage in peer-to-peer data operations, such as reconfiguration of data redundancy configurations, across physical locations 220 through network 202.

In some embodiments, RAID management system 250 may be configured as an application or module in an information technology (IT) management system running on a general-purpose computer, such as such as a personal computer, a laptop, a tablet, a wireless telephone, a personal digital assistant or any other type of communication device that is able to interface with the storage system 200 and/or operational data about storage system 200 over network 202. For example, RAID management system 250 may provide a dashboard for system maps, configuration information, operating data, system/component diagnostics, performance metrics, and/or status information for storage devices 228, storage arrays 226, storage nodes 224, host nodes 222, etc. In some embodiments, RAID management system 250 may include RAID configurations, rebuild status, backup/archive configurations, storage device endurance and lifecycle management, and/or storage group configurations. RAID management system 250 may support a number of administrators with varying IT management responsibilities, including provisioning, maintenance, data management, equipment management, and related scheduling, costing, and project management.

In some embodiments, RAID management system 250 may include a RAID group definition 252, a RAID type A configuration 254, and a RAID type B configuration 256. RAID group definition 252 may specify the storage devices and/or volumes or other storage space allocated to one or more RAID groups. For example, RAID group definition 252 may designated one RAID group across storage devices in storage arrays 226.1.1 and 226.1.*n* and another RAID group across storage devices in storage array 226.2. RAID type A configuration 254 and RAID type B configuration 256 may define RAID configuration parameters for two different RAID configurations. These RAID configurations may be applied to one or more RAID groups identified in RAID group definition 252. In some embodiments, these RAID configurations may be different RAID levels, such as RAID 10, RAID 5, or RAID 6. In some embodiments, these RAID configurations may include different parameters for the same RAID level, such as different RAID block or RAID stripe sizes for RAID 5 or RAID 6. The RAID configurations may include storage configuration parameters that define how the RAID data, both original host data and mirror or parity data, are written to the RAID group storage devices, such that one set of storage configuration parameters is different from the another set of storage configuration parameters and would not result in the same allocation of data elements to the storage media of the storage group.

In some embodiments, RAID management 250 may enable the RAID configuration of a RAID group to be changed from RAID type A 254 to RAID type B 256 or vice versa. This reconfiguration of data redundancy configurations may be completed using only the storage devices in the existing storage group without losing the host data currently stored in the first RAID configuration, effectively migrating the host data from the first RAID configuration to the second RAID configuration. In some embodiments, this reconfiguration may be completed while the RAID group is online and available for host data read/write operations.

Figure 3:
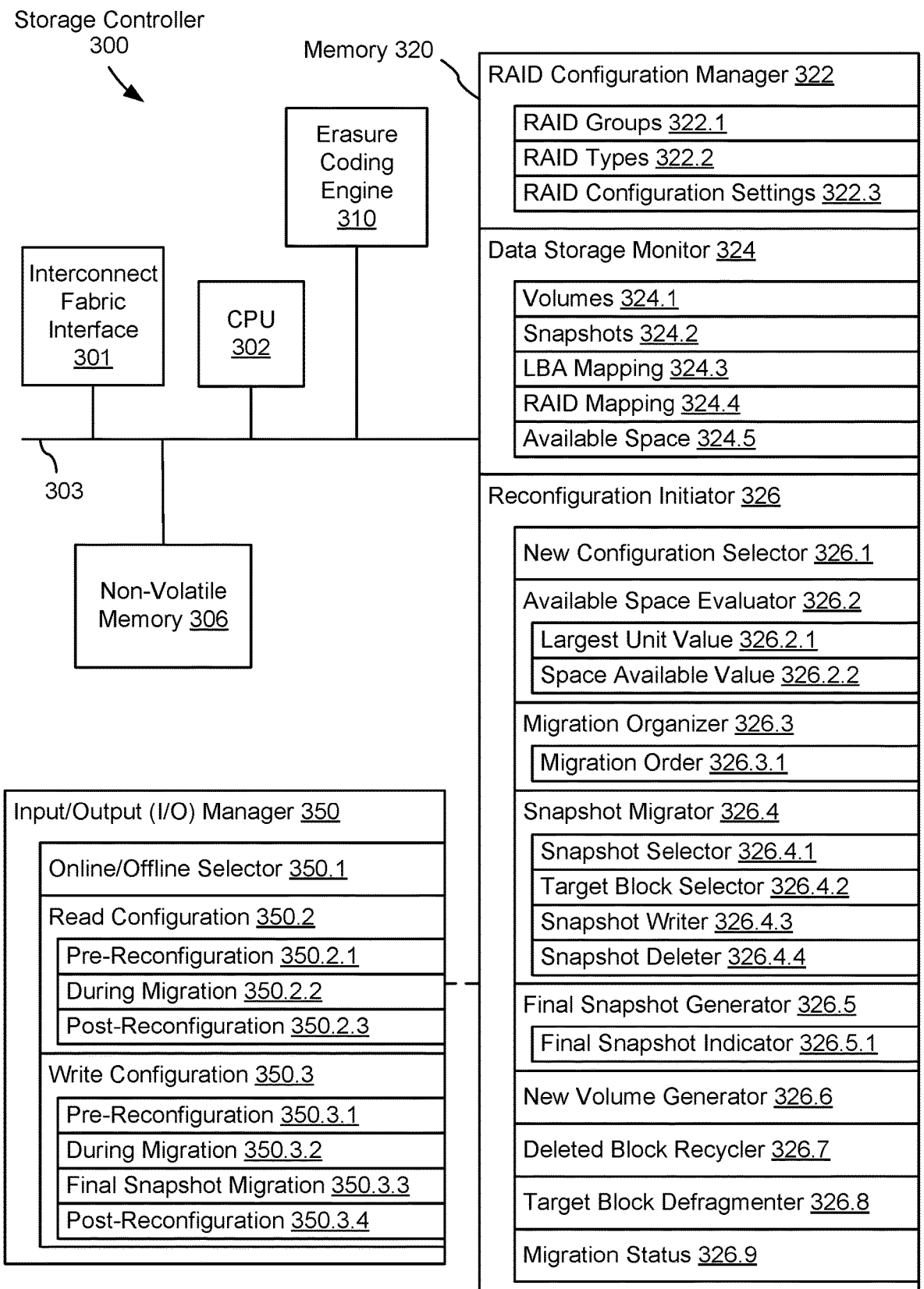
FIG. 3 schematically illustrates an example of a RAID controller, such as may be used with the data storage systems of FIGS. 1 and 2.

In some embodiments, as shown in FIG. 3, a storage controller may be configured for migrating a storage group between two RAID configurations using compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPUs 302 are shared by one or more components within, and in some cases, beyond the function of storage controller 300. The modules in memory 320 and executed by CPU 302 may be coupled to interconnect fabric interface 301, non-volatile memory 306, erasure coding engine 310, and any number of additional modules, such as error correction engines, specialized memory modules, etc., in order to coordinate the operation of these components. In some embodiments, the components of storage controller 300 may be interconnected by one or more communication buses 303. In some embodiments, CPU 302, memory 320, non-volatile memory 306, erasure coding engine 310, and any number of additional modules may be implemented in an application-specific integrated circuit (ASIC), system on a chip (SoC), field programmable gate array (FPGA), or similar architecture.

In some embodiments, erasure coding engine 310 may be a hardware, software, or combined hardware/software engine for providing exclusive-or calculations or implementing another erasure coding operation. Erasure coding engine 310 may support multiple functions stored in memory 320 and/or support exclusive-or (XOR) or other erasure code processing of data being transferred to or from non-volatile memory 306. In some embodiments, erasure coding engine 310 may be used to process recovery data, such as paired XOR data and parity data, to calculate the data content of a failed or corrupted data unit.

Additional modules (not shown) supporting one or more functions of storage controller 300 may be connected to CPU 302, non-volatile memory 306, erasure coding engine 310, and memory 320. In some embodiments, additional module(s) are executed in software by the CPU 302; in other embodiments, additional module(s) are implemented in whole or in part using special purpose circuitry (e.g., to perform encoding and decoding functions)

Memory 320 may include one or more modules for supporting the functions of storage controller 300. In some embodiments, input/output (I/O) manager 350 may be embodied in memory 320 or may be embodied in another component or subsystem of the storage system to which storage controller 300 is connected. Storage controller 300 includes CPU 302 for executing modules, programs, and/or instructions stored in memory 320 and thereby performing processing operations, memory 320 (sometimes called controller memory or operating memory), and one or more communication buses 303 for interconnecting these components.

The one or more communication buses 303 optionally include circuitry (sometimes called a chipset) that interconnects and controls communications between system components. CPU 302 and memory 320 may be coupled to interconnect fabric interface 301, non-volatile memory 306, erasure coding engine 310, and any additional module(s) by the one or more communication buses 303. In some embodiments, interface hardware and/or protocols for providing communication through communication buses 303 may also be present for communication with any given component.

Memory 320 may include high-speed random access memory, such as dynamic random access memory (DRAM), static random access memory (SRAM), double data rate (DDR) random access memory (RAM), or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or non-volatile memory 306. These functional memories may include specialized processing, hardware acceleration, and/or other resources related to their function. In some embodiments, non-volatile memory 306 may be part of memory 320.

Memory 320, or alternatively non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:

RAID configuration manager 322 for managing the storage groups and data redundancy configurations of the storage array(s) associated with storage controller 300;

data storage monitor 324 for monitoring the configuration of data elements or data units stored within the storage array(s) associated with storage controller 300;

reconfiguration initiator 326 for managing reconfiguration of the data elements or data units stored within the storage array(s) associated with storage controller 300 from a prior data redundancy configuration to a new data redundancy configuration; and I/O manager 350 for managing data operations to the storage array(s) associated with storage controller 300 and/or the availability of the storage array(s) for data operations from other systems or components.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

In some embodiments, RAID configuration manager 322 may provide message handling, processing logic, and/or data structures for one or more configuration management services. In some embodiments, RAID configuration manager 322 may be used for an initial configuration of RAID parameters and provide a common data structure of those parameters for use by storage devices. The actual allocation and maintenance of RAID stripes for incoming host writes may be managed by other RAID modules in storage controller 300 (not shown) or RAID storage managers in other components. Similarly, RAID recovery and/or RAID group rebuild may be managed by other RAID modules in storage controller 300 (not shown) or RAID rebuild managers in other components. RAID configuration manager 322 may provide a graphical user interface to enable a storage administrator to access, review, and/or configure some or all of the configuration parameters therein. In some embodiments, RAID configuration manager 322 may include RAID groups 322.1, RAID types 322.2, and RAID configuration settings 322.3.

RAID groups 322.1 may include a definition data structure, such as a table or file, that defines the storage devices and related parameters for one or more data redundancy groups associated with storage controller 300. For example, RAID groups 322.1 may identify a list of storage devices mapped to a storage group identifier. Each storage device entry may further include descriptive, status, and/or device configuration parameters. For example, the capacity of each storage device allocated to the RAID group may be identified.

RAID types 322.2 may include one or more templates for selecting data redundancy schemes from those available and supported by storage controller 300. For example, RAID types 322.2 may include definition templates for different RAID levels, such as RAID 1, RAID 10, RAID 5, RAID 6, and/or less commonly used RAID or other data redundancy types. In some embodiments, RAID types 322.2 may be used to define the current RAID configuration for one or more RAID groups 322.1 and/or may be selectable by reconfiguration initiator 326 for configuring the new RAID configuration for a reconfiguration.

RAID configuration settings 322.3 may include a data structure, such as a table or configuration file, that define the RAID configuration for a particular RAID group. For example, RAID configuration settings 322.3 may map storage device parameters from RAID groups 322.1 to the template for a selected RAID type from RAID types 322.2. In some embodiments, RAID configuration settings 322.2 may include configurable parameters, such as designating specific parity devices or patterns for allocating parity blocks, stripe sizes, block or chunk sizes, mirroring pairings, and other features that describe the way in which writes should be allocated under a selected data redundancy configuration.

In some embodiments, data storage monitor 324 may provide message handling, interfaces, processing logic, and/or data structures for one or more storage monitoring services. For example, data storage monitor 324 may collect information relevant to the actual use of storage space within each RAID group to enable other components, such as reconfiguration initiator 326, to assess, allocate, and migrate the data elements stored in the RAID group during a reconfiguration process. In some embodiments, data storage monitor 324 may monitor and store or access metadata describing volumes 324.1, snapshots 324.2, LBA mapping 324.3, RAID mapping 324.4, and/or available space 324.5. In some embodiments, these various storage parameters may be generated or collected by other storage operations or modules and data storage monitor 324 may aggregate or provide an interface to those parameters for use by other components. In other embodiments, other modules may be configured to access a common data register, metadata store, or similar resource for this information.

In some embodiments, reconfiguration initiator 326 may provide message handling, interfaces, processing logic, and/or data structures for initiating and managing a change in data redundancy configuration. Reconfiguration initiator 326 may be configured to enable a user to initiate a change in data redundancy configuration for an existing storage group. For example, reconfiguration initiator 326 may receive a RAID group identifier and new RAID configuration settings to migrate the RAID group from the current data redundancy configuration to the new RAID configuration. In some embodiments, reconfiguration initiator 326 include a new configuration selector 326.1, an available space evaluator 326.2, a migration organizer 326.3, a snapshot migrator 326.4, a final snapshot generator 326.5, a new volume generator 326.6, a deleted block recycler 326.7, a target block defragmenter 326.8, and migration status indicator 326.9.

In some embodiments, new configuration selector 326.1 may include software code stored in memory 320 and executed by processor 302 for receiving input to define the target storage group and/or related storage devices and selecting the new data redundancy configuration. For example, new configuration selector 326.1 may receive a RAID group identifier, new RAID type, and/or related new RAID configuration settings that generally comply with the organization of parameters managed by configuration manager 322. In some embodiments, new configuration selector 326.1 may include a graphical user interface for enabling a user to make the relevant selections for the new RAID configuration. For example, RAID configuration manager 322 may include an interface for displaying current RAID configuration information for one or more RAID groups and allowing a user to select a reconfiguration option for one or more RAID groups. In some embodiments, receiving parameters for a new RAID configuration may initiate the RAID reconfiguration process using reconfiguration initiator 326. Parameters may be received from entry by a user or from an automated reconfiguration selection and/or message made by storage controller 300 or received from another system component.

In some embodiments, available space evaluator 326.2 may include software code stored in memory 320 and executed by processor 302 for quantifying the unused storage space in the storage group and comparing it against the storage space needed for migrating the data elements from the current RAID configuration into the new RAID configuration. For example, available space evaluator 326.2 may compare a largest unit value 326.2.1 to a space available value 326.2.2 to determine whether the largest data unit for migration is equal to or smaller than the available space. In some embodiments, available space evaluator 326.2 may use data accessible from or through data storage monitor 324 to determine largest unit value 326.2.1 and/or space available value 326.2.2. For example, available space evaluator 326.2 may retrieve size values for volumes 324.1 and snapshots 324.2 and evaluate or sort them to determine the largest single logical data unit that would be migrated to the available space during sequential migration. Space available value 326.2.2 may be determined from available space 324.5. In some embodiments, available space evaluator 326.2 may calculate a migration factor for the data requirements of the new RAID configuration of the largest logical data unit, such as requirements for parity or mirroring of data that may not include parity or mirroring in its current RAID configuration. Available space evaluator 326.2 may return an error or initiate a process for expanding the available storage space or reducing the logical data units for migration in response to determining that space available value 326.2.2 is smaller than largest unit value 326.2.1.

In some embodiments, migration organizer 326.3 may include software code stored in memory 320 and executed by processor 302 for identifying the logical data units and logical data subunits to be migrated. For example, migration organizer 326.3 may receive a list of logical data units and logical data subunits from data storage monitor 324 and/or available space evaluator 326.2 (which may have created such a list in evaluating the largest data unit for migration) and order them in a migration order 326.3.1. In some embodiments, the list of data units, including both logical data units and logical data subunits, may be ordered according to size. For example, the largest volume or snapshot may be first in migration order 326.3.1 and the smallest volume or snapshot may be placed last. In some embodiments, only the snapshots associated each volume may be ordered from largest to smallest, but the volumes themselves may not be migrated until all associated snapshots are migrated and a final snapshot is generated to migrate the remaining volume. Other migration orders are possible, such as smallest to largest, alternating between larger and smaller data units, or based on another migration criteria for determining priority, such as time of last read/write operation to the logical unit, frequency of read/write requests, or explicit priority values for ordering the migration.

In some embodiments, snapshot migrator 326.4 may include software code stored in memory 320 and executed by processor 302 for sequentially migrating snapshots according to migration order 326.3.1. For example, for each snapshot in migration order 326.3.1, snapshot migrator 326.4 may select the next snapshot using snapshot selector 326.4.1, select a target storage location in the available space using target block selector 326.4.2, write the selected snapshot to the selected target storage location using snapshot writer 326.4.3, and delete the original snapshot using the snapshot deleter 326.4.4. In some embodiments, target block selector 326.4.2 may use target block defragmenter 326.8 for selecting the next target block in such a way that the available space is defragmented and the migrated writes are organized sequentially or in another preferred storage pattern for reducing data unit fragmentation. In some embodiments, snapshot writer 326.4.3 and snapshot deleter 326.4 may use conventional read/write and/or delete commands to the respective storage devices for reading, writing, and deleting data units. In some embodiments, the writing of the next snapshot in the migration order by snapshot writer 326.4.3 may be conditioned on and responsive to completion of the delete operation for the prior snapshot. For example, the available space may require that each snapshot is processed sequentially such that only one logical subunit is ever duplicated between the original RAID configuration and the new RAID configuration at any given time.

In some embodiments, final snapshot generator 326.5 may include software code stored in memory 320 and executed by processor 302 for converting the remaining logical data unit to a logical data subunit for migration to the new RAID configuration. For example, once all snapshots associated with a particular volume have been migrated and deleted from the original RAID configuration, final snapshot generator 326.5 may generate a snapshot of that volume that captures all remaining data. The final snapshot can then be migrated by snapshot migrator 326.3 to transfer the volume data. In some embodiments, final snapshot generator 326.5 may include a final snapshot indicator 326.5.1 to indicate to snapshot migrator 326.4, new volume generator 326.6, and/or or I/O manager 350 that the final snapshot from the volume is being processed. For example, final snapshot indicator 326.5.1 may be a metadata value associated with the final snapshot or may be a flag, parameter, status indicator, or other value passed to or accessible by other components to identify the final snapshot migration process.

In some embodiments, new volume generator 326.6 may include software code stored in memory 320 and executed by processor 302 for converting the final snapshot back into a volume after migration to the new RAID configuration. For example, responsive to completion of the write of the final snapshot (corresponding to the remaining volume) by snapshot writer 326.4.3 to the available space, the final snapshot may be converted into a volume in the new RAID configuration. In some embodiments, conversion to the volume may include designating the volume as active for read/write requests going forward, such as within I/O manager 350.

In some embodiments, deleted block recycler 326.7 may include software code stored in memory 320 and executed by processor 302 for identifying storage locations in the storage group that have been freed by the deletion of snapshots and may now be added to the available space for future snapshot migrations. For example, responsive to snapshot deleter 326.4.4, deleted block recycler 326.7 may add the storage locations (e.g. data blocks) previously occupied by the snapshot in the original RAID configuration to available space that may be selected by target block selector 326.4.2. In some embodiments, deleted blocks identified by deleted block recycler 326.7 may be provided to target block defragmenter 326.8 for identifying defragmented storage locations for target block selector 326.4.2 and snapshot writer 326.4.3.

In some embodiments, target block defragmenter 326.8 may include software code stored in memory 320 and executed by processor 302 for defragmenting the available space in the storage group for more efficient storage and retrieval of the snapshots being written in the new RAID configuration. For example, responsive to deleted block recycler 326.7 and/or target block selector 326.4.2, target block defragmenter 326.8 may run a defragmentation algorithm to identify a continuous block of storage sized to accommodate the next snapshot being written by snapshot writer 326.4.3. In some embodiments, target block defragmenter 326.8 may assist target block selector 326.4.2 by identifying the least fragmented target block available for the next snapshot.

In some embodiments, migration status indicator 326.9 may include software code stored in memory 320 and executed by processor 302 for indicating the status of a RAID reconfiguration operation in process by reconfiguration initiator 326. For example, migration status indicator 326.9 may include a status value and/or an associated graphical interface element for indicating a percentage complete, snapshots complete, or other progress of the migration from the prior RAID configuration to the new RAID configuration. In some embodiments, migration status indicator 326.9 may indicate one or more phases of reconfiguration, such as the reconfiguration phases used by I/O manager 350 to determine read/write operations. For example, migration status indicator 326.9 may include phase indicators for pre-reconfiguration (migration initiated), snapshot migration, final snapshot migration, and post-reconfiguration (migration complete). In some embodiments, migration status indicator 326.9 may monitor and reflect status indicators for multiple storage groups, logical data units, and/or logical data subunits. For example, migration status indicator 326.9 may provide one or more status indicators for each volume involved in a storage group migration.

In some embodiments, I/O manager 350 may include software code stored in memory 320 and executed by processor 302 for controlling which volumes and snapshots are used for processing read/write requests to RAID groups during the reconfiguration process. For example, I/O manager 350 may include active status for host read/write operations to volumes and snapshots associated with storage controller 300. I/O manager 350 may determine whether reconfiguration is processed online or offline and manage read and write operation configurations separately for different phases of the reconfiguration process. Similar to migration status 326.9, I/O manager 350 may manage online/offline and read/write configurations at whatever level of logical data grouping is appropriate, such as RAID group, volume, or snapshot. In some embodiments, I/O manager 350 may include an online/offline selector 350.1, a read configuration 350.2, and a write configuration 350.3.

In some embodiments, I/O manager 350 may include an online/offline selector 350.1 to determine whether a RAID group stays online for host read/write operations during a reconfiguration process. For example, when a new RAID configuration is selected through new configuration selector 326.1, a selectable option may be provided for determining whether the reconfiguration will be processed with read/write access online or the RAID group will be isolated from host read/write operations to use more of its processing and storage resources for completing the migration more quickly and that selection may be communicated to online/offline selector 350.1.

In some embodiments, read configuration 350.2 and write configuration 350.3 may include a configuration table or configuration file for managing read/write handling related to storage controller 300 or, more specifically, a RAID group in the reconfiguration process. For example, read configuration 350.2 may include: pre-reconfiguration phase settings 350.2.1 that process reads from the volumes and snapshots in the original data redundancy configuration; a during migration phase 350.2.2 that processes reads from the original volume and/or the original or migrated snapshots as they are moved; and a post-reconfiguration phase 350.2.3 that moves all read processing to the new volume and snapshots going forward. Write configuration 350.3 may include: pre-reconfiguration phase settings 350.3.1 that process writes to the volumes and snapshots in the original data redundancy configuration; a during migration phase 350.3.2 that processes writes to the original volume as the snapshots are moved; a final snapshot migration phase (that moves the volume itself) that processes writes to both the original volume and queues them to the new volume after the final snapshot is created; and a post-reconfiguration phase 350.2.3 that moves all write processing to the new volume going forward. Migration phase 350.3.2 and final snapshot migration phase 350.3 may be referred to as reconfiguration phases and/or a snapshot migration phase and a volume migration phase (though the migration of the volume is executed through a final snapshot).

As shown in FIGS. 4A and 4B, a RAID group 410 operating within a data storage system, such as data storage system 100, may be operated to reconfigure the data redundancy configuration of a plurality of storage devices 420. For example, a first data redundancy configuration, such as RAID type A 412, may be depicted in FIG. 4A and a second data redundancy configuration, such as RAID type B 414 may be depicted in FIG. 4B for the same RAID group 410 and storage devices 420.

In FIG. 4A, RAID group 410 may be configured in RAID 10 with data mirroring. Each pair of storage devices (e.g., storage devices 420.1 and 420.2, 420.3 and 420.4, 420.5 and 420.6, 420.7 and 420.8) mirrors the host data elements 450 on its paired storage device. For example, storage device 420.1 and 420.2 each include data elements 450.1, 450.5, 450.9, 450.13, and 450.17. Each storage device 420 also includes available storage spaces 430.1-430.8. Available storage spaces 430.1-430.8 may be used to migrate the data elements 450 to a data redundancy configuration using RAID type B 414 as shown in FIG. 4B according to the systems and methods described herein.

In FIG. 4B, RAID group 410 may be newly configured in RAID 6 using a pair of parity blocks 452 for every six or fewer data blocks. Thus, host data blocks 450.1-450.20 may be arranged in 4 RAID stripes with party overhead of 8 blocks, for a total of 28 blocks, where the same host data protected under RAID type A 412 had required 40 blocks. As a result, available storage spaces 430.9-16 may be larger than the corresponding available storage spaces 430.1-430.8, providing additional available capacity in RAID group 410.

Figure 5:
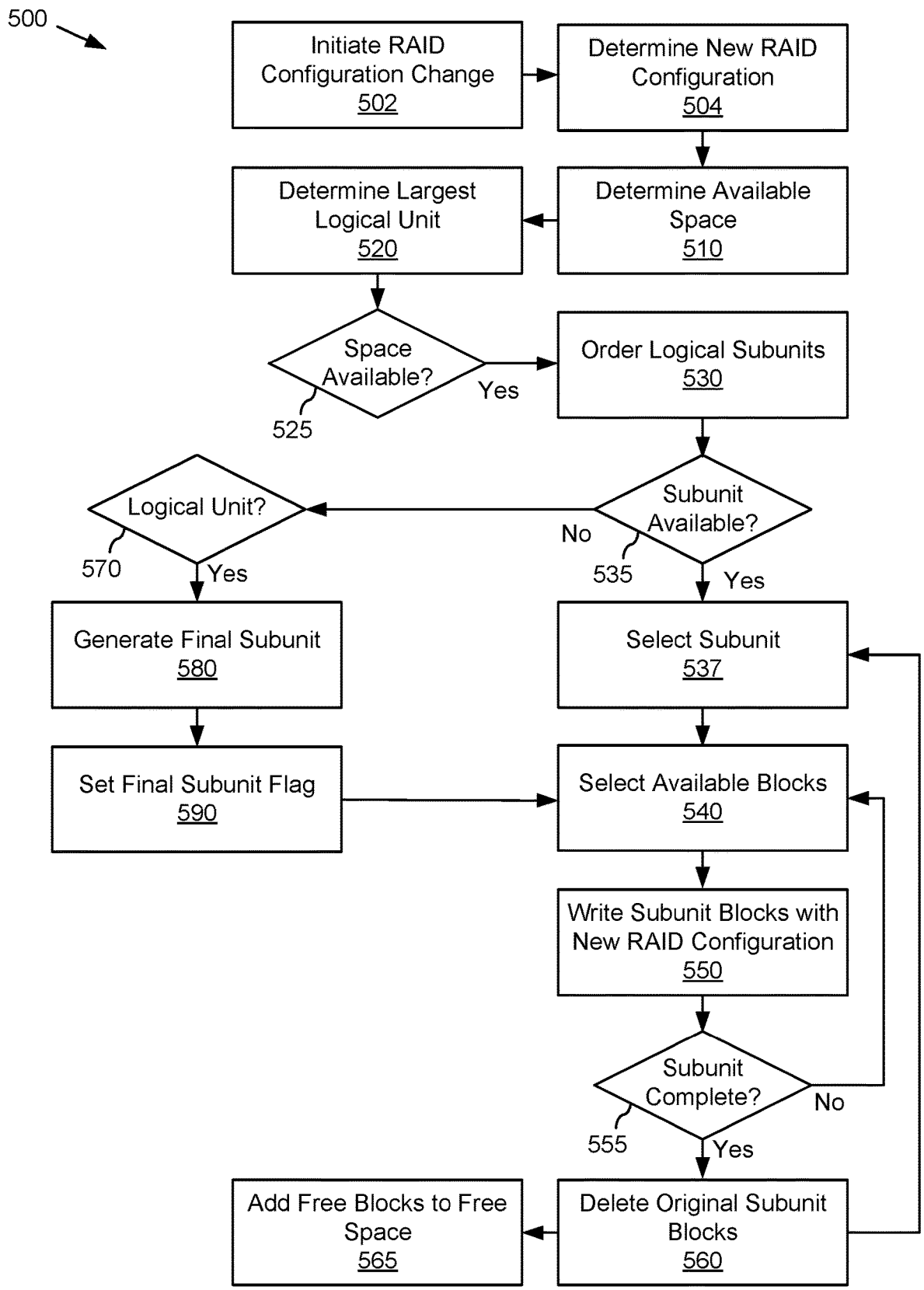
FIG. 5 illustrates an example of a method for data redundancy reconfiguration using logical subunits.

As shown in FIG. 5, storage controller 300 operating within data storage system 100 may be operated according to a process for iteratively migrating subunits to reconfigure the data redundancy configuration of host data within the same set of storage devices, such as the storage group 410. For example, storage controller 300 may initiate RAID reconfiguration according to the method 500 illustrated by blocks 502-590 of FIG. 5.

At block 502, a RAID configuration change may be initiated. For example, a system administrator or an automated system assessment may determine that a different RAID configuration than the current RAID configuration would improve the capacity, efficiency, latency, or other value driver for the storage system and initiate a RAID configuration change using the existing resources within the RAID group.

At block 504, the new RAID configuration may be determined. For example, a RAID group currently configured in RAID 10 may be identified for reconfiguration into RAID 5 or 6.

At block 510, the amount of available space in the storage group that is not currently occupied by host data or other uses may be determined. For example, the amount of unallocated storage, quantified in terms of logical memory space (blocks, bytes, or other units of measure), for each storage device in the RAID group may be determined and aggregated to determine the available space.

At block 520, the largest logical data unit to be migrated during the reconfiguration may be determined. For example, each of the logical data units, such as volumes and snapshots, may be evaluated or ordered according to their size to determine the largest data unit that will be migrated in a given iteration.

At block 525, the largest logical data unit may be compared to the available space to determine whether the space available is greater than the largest logical data unit. If there is space available for the largest logical data unit, then method 500 may proceed block 530. Otherwise, method 500 may stop. As long as the largest logical data unit can be accommodated in the available space, then the migration may be completed by iteratively writing logical data units in the new configuration and deleting the original logical data unit to make space for the next logical data unit.

At block 530, the logical data subunits may be ordered in a migration order for iterative migration into the new RAID configuration. For example, the snapshots may be ordered according to size from largest to smallest.

At block 535, the storage system may determine whether any logical data subunits are available for migration. If a next logical data subunit is available, then method 500 may proceed to block 537. If no logical data subunits are available, then method 500 may proceed to block 570.

At block 537, an available logical data subunit may be selected for migration. For example, the next logical data subunit in the migration order may be selected.

At block 540, unused data blocks in the available space sufficient to accommodate the selected logical data subunit may be selected. For example, migration of 5 GB snapshot may require an allocation of 5 GB (gigabytes) of unused data blocks or, if the new RAID configuration imposes additional data redundancy overhead, such as 100% for mirroring or 50% for a particular parity scheme, then 10 GB or 7.5 GB (respectively) of unused data blocks may be allocated.

At block 550, the subunit data blocks corresponding to the logical data subunit and any related data redundancy data may be written in the new RAID configuration in the allocated data blocks allocated at block 540. For example, the selected logical data subunit may be written in the allocated data blocks in one or more of the storage devices in the RAID group according to the new RAID configuration.

In some implementations, not all blocks may be selected and written at the same time and block selection (at block 540) and block write (at block 550) may be iterated until the subunit is complete. For example, the logical data subunit may be evaluated to see whether it is complete at block 555. If the logical data subunit is complete, method 500 may proceed to block 560. If the logical data subunit is not complete, method 500 may return to select the next available block at block 540.

At block 560, the original logical data subunit blocks are deleted from their storage location in the original RAID configuration. For example, once a snapshot has been completely rewritten in the new RAID configuration, the original snapshot may be deleted. Where there is parity coding or similar contingent erasure coding used in the original RAID configuration, logical data subunits should align with RAID stripes or similar RAID data relationships to assure that deletion of one subunit does not compromise the data protection of another subunit.

At block 565, the blocks freed by deleting the original logical data subunit may be added to the available space for migration of the next logical data subunit. For example, once the 5 GB of the original snapshot are deleted, that 5 GB of storage space may be used for a future snapshot.

At block 570, the system may determine that the logical unit has not yet been migrated after all related subunits have been migrated. For example, after all snapshots have been migrated, the only remaining data in the original RAID configuration for that volume may be the volume itself. If so, method 500 may proceed to block 580. If not, the reconfiguration may be complete (or may be restarted for other volumes).

At block 580, a final logical data subunit may be generated from the logical data unit. For example, a snapshot may be generated from the remaining volume so that the snapshot may be used for the migration to the new RAID configuration.

At block 590, a final logical data subunit flag may be set to initiate further processing to complete migration of the volume. For example, the final logical data subunit flag may be used to identify the snapshot that should be converted to the active volume in the new RAID configuration and/or may be used to trigger the next phase of online read/write processing.

Figure 6:
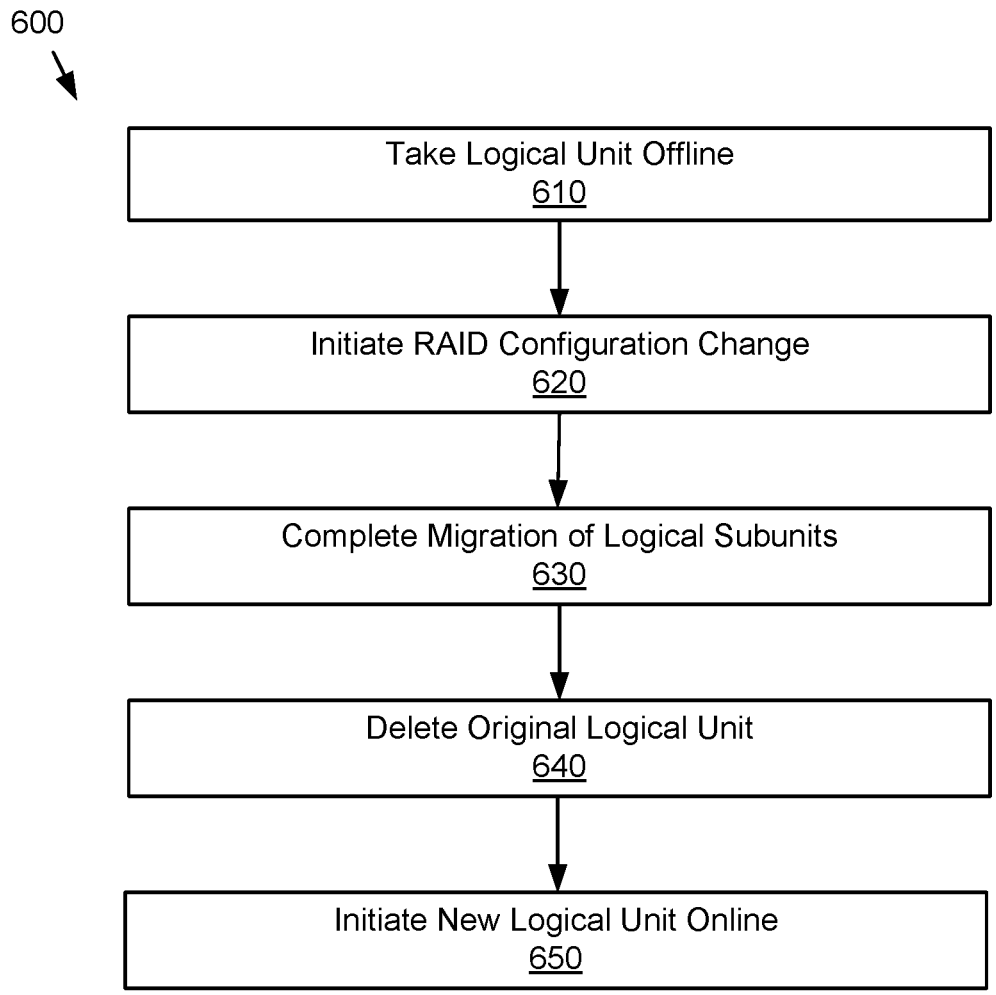
FIG. 6 illustrates an example of a method for reconfiguring a storage group while taking logical units offline.

As shown in FIG. 6, storage controller 300 operating within data storage system 100 may be operated according to a process for iteratively migrating subunits to reconfigure the data redundancy configuration of host data within the same set of storage devices, such as the storage group 410. For example, storage controller 300 may initiate RAID reconfiguration offline according to the method 600 illustrated by blocks 610-650 of FIG. 6.

At block 610, the logical data unit to be reconfigured is taken offline. For example, host read/write operation to the logical data unit or the storage group may be suspended during the reconfiguration process.

At block 620, the RAID configuration change may be initiated. For example, the RAID configuration change may be determined and executed as described above regarding method 500.

At block 630, the migration of logical data subunits may be completed. For example, the logical data subunits corresponding to the logical data unit may be iteratively migrated as described above regarding method 500.

At block 640, the original logical data unit may be deleted. For example, after the logical data subunit corresponding to the logical data unit is generated and migrated, it may be deleted as described above regarding method 500.

At block 650, the new logical data unit in the new RAID configuration may be initiated online. For example, the new volume in the new RAID configuration may be initiated online as the active volume, replacing the original volume for host data read/write operations.

Figure 7:
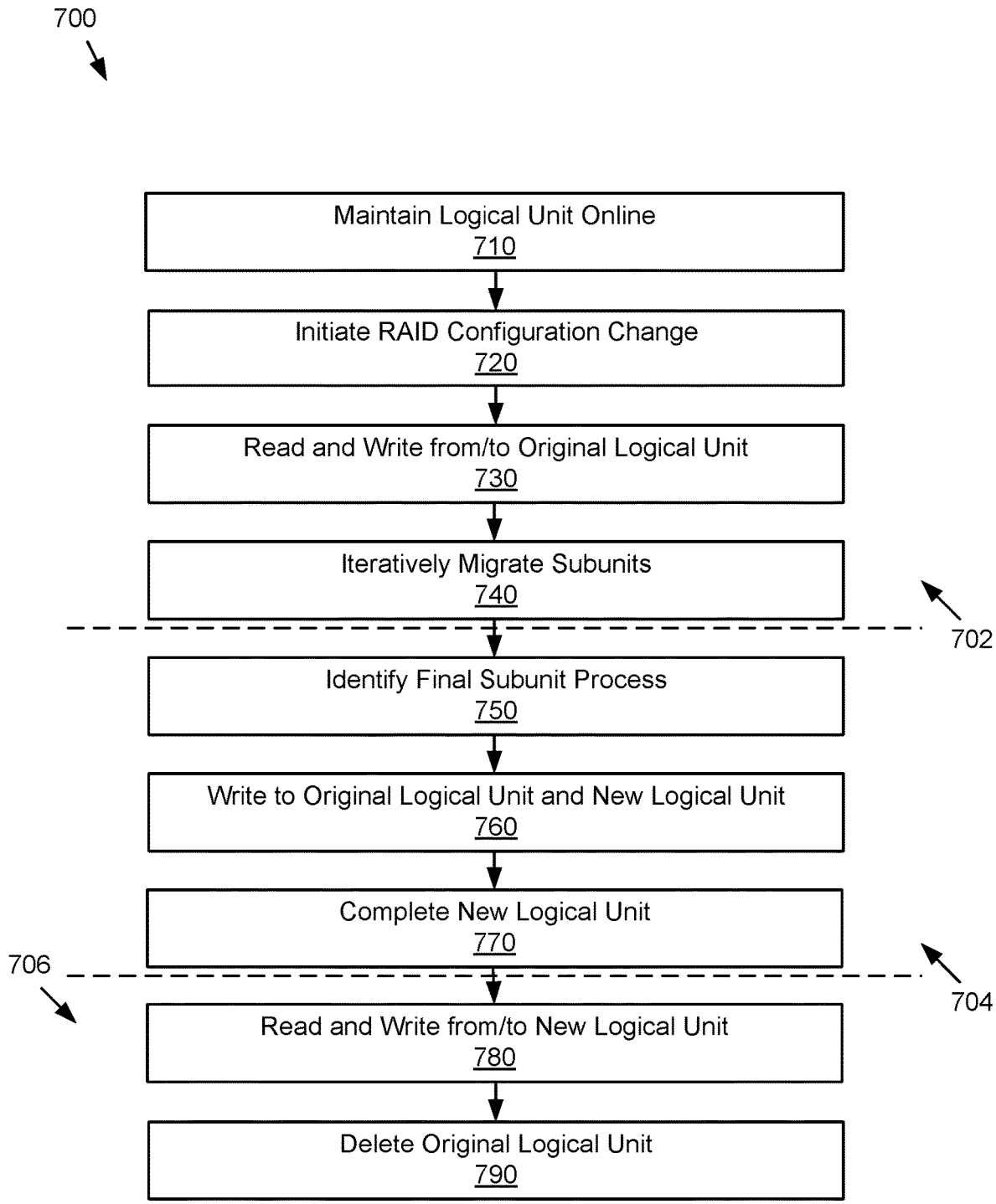
FIG. 7 illustrates an example of a method for online reconfiguration of a storage group using logical subunits.

As shown in FIG. 7, storage controller 300 operating within data storage system 100 may be operated according to a process for iteratively migrating subunits to reconfigure the data redundancy configuration of host data within the same set of storage devices, such as the storage group 410. For example, storage controller 300 may initiate RAID reconfiguration online according to the method 700 illustrated by blocks 710-790 of FIG. 6.

At block 710, the logical data unit to be reconfigured is maintained online. For example, host read/write operation to the logical data unit or the storage group may be maintained during the reconfiguration process. During a first reconfiguration phase 702, read and write operations may continue from and to the logical data unit.

At block 720, the RAID configuration change is initiated. For example, the RAID configuration change may be determined and executed as described above regarding method 500.

At block 730, read and write operations continue to be processed against the original logical data unit in the original RAID configuration. For example, operations to the logical data unit may be unchanged during first reconfiguration phase 702.

At block 740, the logical data subunits may be iteratively migrated from the original RAID configuration to the new RAID configuration. For example, the logical data subunits corresponding to the logical data unit may be iteratively migrated as described above regarding method 500. In some embodiments, read operations to any logical data subunits, such as snapshots, related to the logical data unit will be redirected as the snapshots are migrated and the original snapshots are deleted.

At block 750, final subunit process for converting the logical data unit to a subunit and migrating the subunit may be identified. For example, when no subunits remain, the logical data unit may be migrated as described above regarding method 500. Identification of this process, such as through the final subunit flag, may initiate a second reconfiguration phase 704.

At block 760, write operations to the logical data unit may be modified to process each write operation to both the original logical data unit in the old RAID configuration and the new logical data unit in the new RAID configuration. For example, writes to the logical data unit may be processed to the original volume and queued for processing by the new volume as soon as it is available.

At block 770, the new logical data unit in the new RAID configuration may be completed. For example, the final snapshot written in the new RAID configuration may be converted to the active volume and the queued duplicate writes may be processed against it.

At block 780, read and write operations may be processed from the new logical data unit in the new RAID configuration going forward. For example, the new volume created from the final snapshot may be the active volume going forward. Activating the new volume may initiated a post-reconfiguration phase 706.

At block 790, the original logical data unit in the original RAID configuration may be deleted. For example, the original volume may be deleted to complete the reconfiguration process.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
    a processor;
    a memory;
    a plurality of storage devices configured as a storage group in a first data redundancy configuration, wherein at least one logical data unit is stored in the plurality of storage devices with the first data redundancy configuration; and
    a reconfiguration initiator stored in the memory and executable by the processor to perform operations comprising:
        accessing a request to migrate data stored at a plurality of storage devices from storage in a first volume having a first data redundancy configuration to storage in a second volume having a second data redundancy configuration;
        determining a quantity of available data blocks in the plurality of storage devices;
        selecting at least one logical data subunit from the data;
        migrating the at least one logical data subunit to one or more of the available data blocks in accordance with the second data redundancy configuration;
        during migration of the at least one logical data subunit, receiving a user write operation indicating a change to a portion of the data;
        in response to receiving the user write operation:
            processing the user write operation to the first volume implementing the change to the portion of the data at the first volume in accordance with the first data redundancy configuration; and
            queuing a duplicate user write operation;
        migrating a final data subunit from the first volume to one or more other available data blocks at the plurality of storage devices;
        activating the second volume subsequent to migrating the final data subunit; and
        processing the queued duplicate user write operation to the activated second volume implementing the change to the portion of the data at the activated second volume in accordance with the second data redundancy configuration.

2. The system of claim 1, wherein the reconfiguration initiator is further executable to perform operations comprising:
    ordering a plurality of logical data subunits, including the at least one logical data subunit, in a migration order; and
    repeating, according to the migration order, migrating each logical data subunit from the plurality of logical data subunits to the second volume in accordance with the second data redundancy configuration.

3. The system of claim 2, wherein the reconfiguration initiator is further executable to perform operations comprising:
    generating the final data subunit corresponding to a set of data blocks in at least one logical data unit; and
    deleting, responsive to migrating the final data subunit, the at least one logical data unit in the first data redundancy configuration.

4. The system of claim 2, wherein the migration order is ordered according to size.

5. The system of claim 1, wherein the reconfiguration initiator is further executable to perform operations comprising:
    selecting the one or more available storage blocks for migration of the at least one logical subunit.

6. The system of claim 5, wherein selecting the one or more available blocks defragments the quantity of available data blocks.

7. The system of claim 1, wherein:
    the first data redundancy configuration is a first redundant array of independent disks (RAID) level; and
    the second data redundancy configuration is a second RAID level that is different from the first RAID level.

8. A computer-implemented method, comprising:
    accessing a request to migrate data stored at a plurality of storage devices from storage in a first volume having a first data redundancy configuration to storage in a second volume having a second data redundancy configuration;
    determining a quantity of available data blocks in the plurality of storage devices;
    selecting at least one logical data subunit from the data;
    migrating the at least one logical data subunit to one or more of the available data blocks in accordance with the second data redundancy configuration;

during migration of the at least one logical data subunit, receiving a user write operation indicating a change to a portion of the data;

in response to receiving the user write operation:
processing the user write operation to the first volume implementing the change to the portion of the data at the first volume in accordance with the first data redundancy configuration; and
queuing a duplicate user write operation;

migrating a final data subunit from the first volume to one or more other available data blocks at the plurality of storage devices;

activating the second volume subsequent to migrating the final data subunit; and processing the queued duplicate user write operation to the activated second volume implementing the change to the portion of the data at the activated second volume in accordance with the second data redundancy configuration.

9. The computer-implemented method of claim 8, further comprising:
ordering a plurality of logical data subunits, including the at least one logical data subunit, in a migration order; and
repeating, according to the migration order, migrating each logical data subunit from the plurality of logical data subunits to the second volume in accordance with the second data redundancy configuration.

10. The computer-implemented method of claim 9, further comprising:
generating the final data subunit corresponding to a set of data blocks in at least one logical data unit; and
deleting, responsive to migrating the final data subunit, the at least one logical data unit in the first data redundancy configuration.

11. The computer-implemented method of claim 9, wherein the migration order is ordered according to size.

12. The computer-implemented method of claim 8, further comprising:
selecting the one or more available storage blocks for migration of the at least one logical subunit.

13. The computer-implemented method of claim 12, wherein selecting the one or more available blocks defragments the quantity of available data blocks.

14. The computer-implemented method of claim 8, wherein:
the first data redundancy configuration is a first redundant array of independent disks (RAID) level; and
the second data redundancy configuration is a second RAID level that is different from the first RAID level.

15. A system comprising:
a processor; and
system memory coupled to the processor and storing instructions configured to cause the processor to:
access a request to migrate data stored at a plurality of storage devices from storage in a first volume having a first data redundancy configuration to storage in a second volume having a second data redundancy configuration;
determine a quantity of available data blocks in the plurality of storage devices;
select at least one logical data subunit from the data;
migrate the at least one logical data subunit to one or more of the available data blocks in accordance with the second data redundancy configuration;
during migration of the at least one logical data subunit, receive a user write operation indicating a change to a portion of the data;
in response to receiving the user write operation:
process the user write operation to the first volume implementing the change to the portion of the data at the first volume in accordance with the first data redundancy configuration; and
queue a duplicate user write operation;
migrate a final data subunit from the first volume to one or more other available data blocks at the plurality of storage devices;
activate the second volume subsequent to migrating the final data subunit; and
process the queued duplicate user write operation to the activated second volume implementing the change to the portion of the data at the activated second volume in accordance with the second data redundancy configuration.

16. The system of claim 15, further comprising instructions configured to:
order a plurality of logical data subunits, including the at least one logical data subunit, in a migration order; and
repeat, according to the migration order, migrating each logical data subunit from the plurality of logical data subunits to the second volume in accordance with the second data redundancy configuration.

17. The system of claim 16, further comprising instructions configured to:
generate the final data subunit corresponding to a set of data blocks in at least one logical data unit; and
delete, responsive to migrating the final data subunit, the at least one logical data unit in the first data redundancy configuration.

18. The system of claim 15, wherein the migration order is ordered according to size.

19. The system of claim 15, further comprising instructions configured to:
defragment the quantity of available data blocks by selecting the one or more available storage blocks for migration the at least one logical subunit.

20. The system of claim 15, wherein:
the first data redundancy configuration is a first redundant array of independent disks (RAID) level; and
the second data redundancy configuration is a second RAID level that is different from the first RAID level.

* * * * *